(12) United States Patent
Flajslik et al.

(10) Patent No.: US 10,200,472 B2
(45) Date of Patent: Feb. 5, 2019

(54) COORDINATION FOR ONE-SIDED MEMORY ACCESS IN A PARTITIONED GLOBAL ADDRESS SPACE

(71) Applicant: Intel Corporation, Santa Clara, CA (US)

(72) Inventors: Mario Flajslik, Hudson, MA (US); James Dinan, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 971 days.

(21) Appl. No.: 14/582,240

(22) Filed: Dec. 24, 2014

(65) Prior Publication Data

US 2016/0100010 A1 Apr. 7, 2016

Related U.S. Application Data

(60) Provisional application No. 62/060,500, filed on Oct. 6, 2014.

(51) Int. Cl.
*G06F 12/06* (2006.01)
*H04L 29/08* (2006.01)

(52) U.S. Cl.
CPC ...... *H04L 67/1097* (2013.01); *G06F 12/0653* (2013.01); *G06F 12/0692* (2013.01); *G06F 2212/154* (2013.01)

(58) Field of Classification Search
None
See application file for complete search history.

(56) References Cited

U.S. PATENT DOCUMENTS

| | | | | |
|---|---|---|---|---|
| 2009/0222596 A1* | 9/2009 | Flynn | ...................... | G06F 3/061 710/22 |
| 2011/0078249 A1* | 3/2011 | Blocksome | ............. | G06F 9/544 709/206 |
| 2014/0208059 A1* | 7/2014 | Kogge | ................ | G06F 12/0692 711/203 |

OTHER PUBLICATIONS

Dinan, et al., "One-Sided Append: A New Communication Paradigm for PGAS Models".
Dinan et al., "Contexts: A Mechanism for High Throughput Communication in OpenSHMEM".
Bailey, et al., "The NAS Parallel Benchmarks," NAS Technical Report RNR-94-007, NASA Ames Research Center, Moffett Field, CA. Mar. 1994.

(Continued)

*Primary Examiner* — Jared I Rutz
*Assistant Examiner* — Marwan Ayash
(74) *Attorney, Agent, or Firm* — Grossman, Tucker, Perreault & Pfleger, PLLC

(57) ABSTRACT

Generally, this disclosure provides systems, devices, methods and computer readable media for improved coordination between sender and receiver nodes in a one-sided memory access to a PGAS in a distributed computing environment. The system may include a transceiver module configured to receive a message over a network, the message comprising a data portion and a data size indicator and an offset handler module configured to calculate a destination address from a base address of a memory buffer and an offset counter. The transceiver module may further be configured to write the data portion to the memory buffer at the destination address; and the offset handler module may further be configured to update the offset counter based on the data size indicator.

21 Claims, 7 Drawing Sheets

(56) References Cited

OTHER PUBLICATIONS

Bonachae, et al., "Porting GASNet to Portals: Partitioned Global Address Space (PGAS) Language Support for the Cray XT", CUG 2009.

Barrett, et al., "The Portals 4.0.1 Network Programming Interface," Tech. Rep. SAND2013-3181, Sandia National Laboratories. Apr. 2013.

* cited by examiner

COORDINATION FOR ONE-SIDED MEMORY ACCESS IN A PARTITIONED GLOBAL ADDRESS SPACE

CROSS-REFERENCE TO RELATED APPLICATION(S)

This application claims the benefit, under 35 USC 119(e), of U.S. Provisional Application Ser. No. 62/060,500, filed Oct. 6, 2014, which is hereby incorporated by reference in its entirety.

This invention was made with Government support under contract number H98230-13-D-0124 awarded by the Department of Defense. The Government has certain rights in this invention.

FIELD

The present disclosure relates to memory access in a partitioned global address space (PGAS), and more particularly, to improved coordination of one-sided memory access to a PGAS in a distributed computing environment of a high performance computing (HPC) system.

BACKGROUND

High performance computing systems generally include multiple processor nodes or processing elements that work in parallel, on data stored in a shared global memory, to increase processing performance. The global memory may be a distributed memory that is configured as a partitioned global address space (PGAS) with each partition residing in a local memory of one of the processing elements. Communications between processing elements and the PGAS, for example a read or write of a buffer segment, although appearing to be one-sided at the user/application level, typically involve one or more bi-directional exchanges between a sender node and a receiver node at the network level to maintain correct buffer address offsets. These exchanges and the associated synchronization delays may adversely affect performance.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for improved coordination between sender and receiver nodes in a one-sided memory access to a partitioned global address space (PGAS) in a distributed computing environment. The distributed computing environment may be, for example, a high performance computing (HPC) system that includes multiple processor nodes that share a PGAS and where each node runs an application in parallel operating on a different portion of data. In one-sided communication—for example reading, writing or appending data to a buffer—the application on a sending processor accesses the PGAS memory directly without the need for bi-directional setup messages between sender and receiver processors/applications. Embodiments of the present disclosure provide for the receiver processor to maintain a buffer address offset counter that may be updated based on the size of the data in a message received from a sender, thus eliminating the need to coordinate address offsets between sender and receiver.

Figure 1:
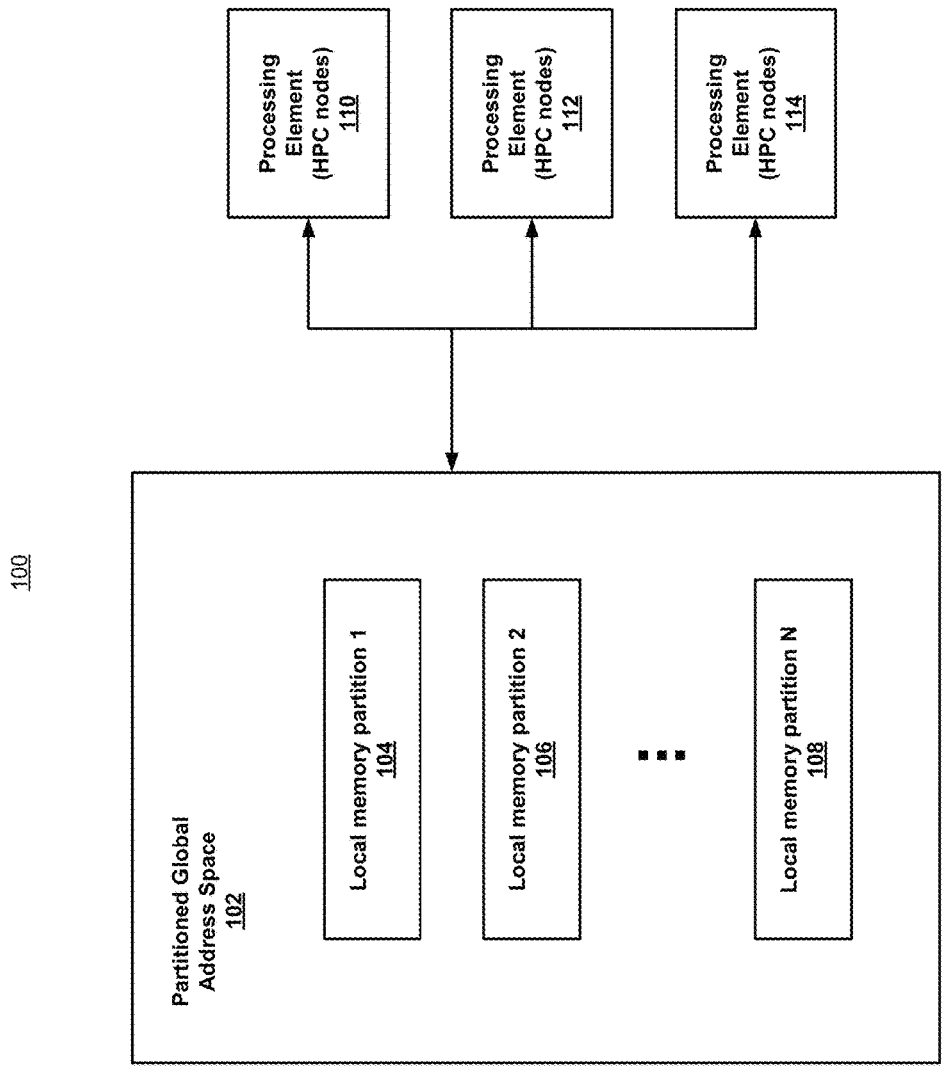
FIG. 1 illustrates a top level diagram of an example embodiment of a partitioned global address space consistent with the present disclosure.

FIG. 1 illustrates a top level diagram 100 of an example embodiment of a partitioned global address space consistent with the present disclosure. A partitioned global address space (PGAS) 102 is shown to include a number of local memory partitions 104, 106 . . . 108. Any particular local memory partition may be associated with, or reside on, one of the processing elements or computing nodes 110, 112, 114 of a high-performance computing system. The processing elements may have access to any or all partitions of the PGAS to form a distributed memory parallel computing environment. Memory access may comply with, or conform to, any suitable data model/library/interface including, for example, current or future versions of the OpenSHMEM specification (published at OpenSHMEM.org).

Figure 2:
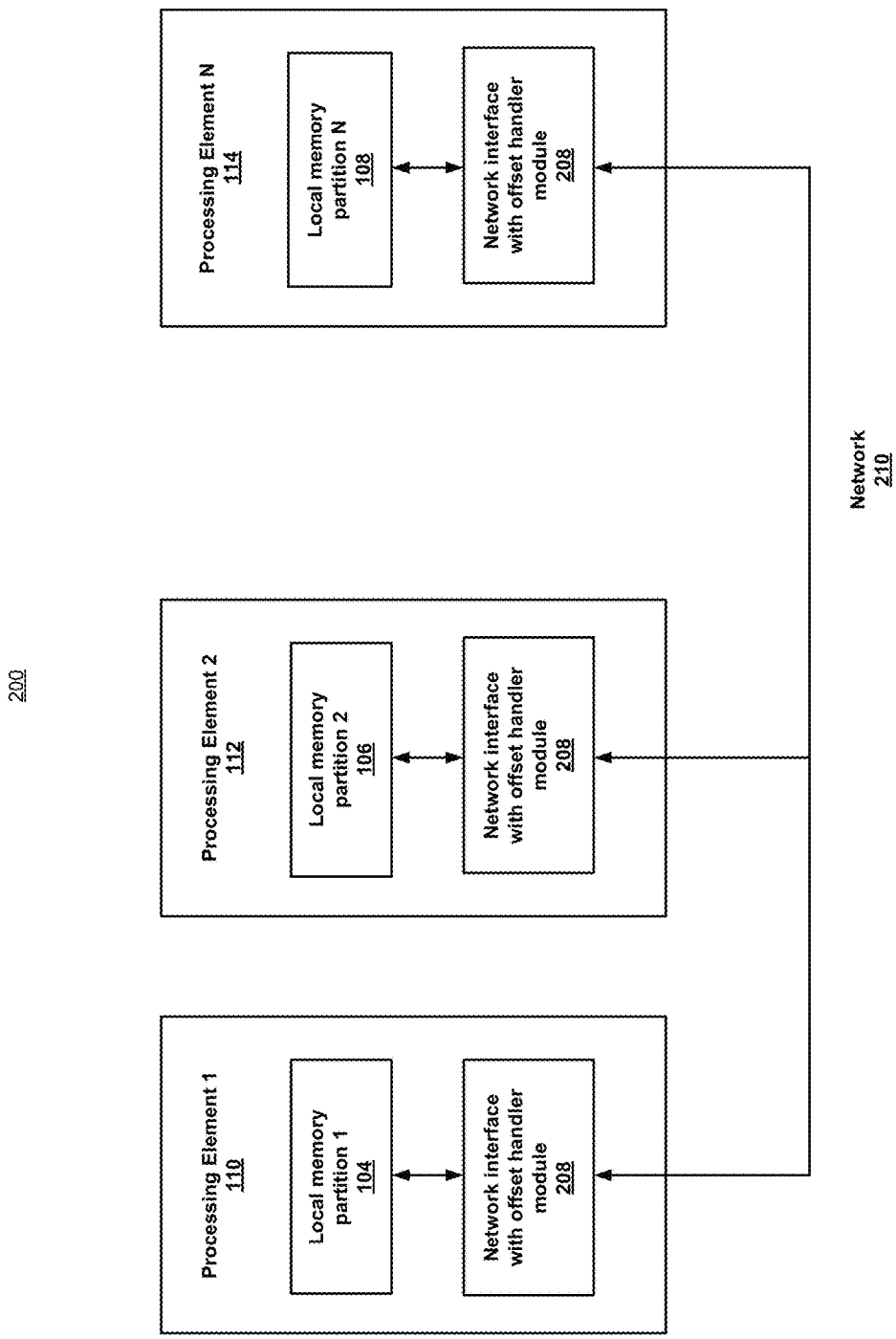
FIG. 2 illustrates a block diagram of one example embodiment consistent with the present disclosure.

FIG. 2 illustrates a block diagram 200 of one example embodiment consistent with the present disclosure. Any number of processing elements 110, 112 . . . 114 may be interconnected through a network 210, such as, for example, an InfiniBand® network or other relatively high speed network. Each processing element is shown to host a portion of the PGAS 102 designated as a local memory partition 104, 106 . . . 108 and also to include a network interface controller 208 employing an offset handler module as will be described in greater detail below.

Applications that are amenable to parallelization, for example sorting applications, often need to append data to a remote buffer (e.g., in a local memory partition on another processing element) in order to exchange data items based on sorting keys associated with those data items. In this scenario, each process, on each processing element or sender node, reserves a portion of the receiver node's buffer using a remote memory access atomic fetch-and-add operation. An atomic memory operation completes in a single step relative to other threads to prevent simultaneous conflicting accesses to the memory location by multiple threads or multiple processors. The sending process then writes its data to the portion of the buffer that it has reserved. In a traditional sender-managed scenario, the fetch-and-add operation includes: (1) transmitting the size of the data to be written from the sender to the receiver; (2) calculating a buffer offset at the receiver; and (3) transmitting a buffer write address back to the sender. The sender then writes the message, including the data, (as a put operation) to the receiver where it will be appended to the buffer at the specified buffer write address. In this sender-managed approach, the sender performs additional communication operations to remotely update the offset counter. Additionally, there is a data dependency at the sender between the fetch-and-add operation and the subsequent put operation, thus requiring the fetch-and-add to complete before the put can be issued, which increases the latency of the operation. In other words, there is an additional network round trip that is required to resolve the data dependency.

In contrast, embodiments of the present disclosure provide for a receiver-managed scenario, as described for example in greater detail with respect to FIG. 3 below, which reduces the number of communication operations between the sender and the receiver by utilizing an agent at the receiver side to calculate the destination address. This enables more efficient operations, for example, parallel sort key exchanges between processing elements may be accelerated.

Figure 3:
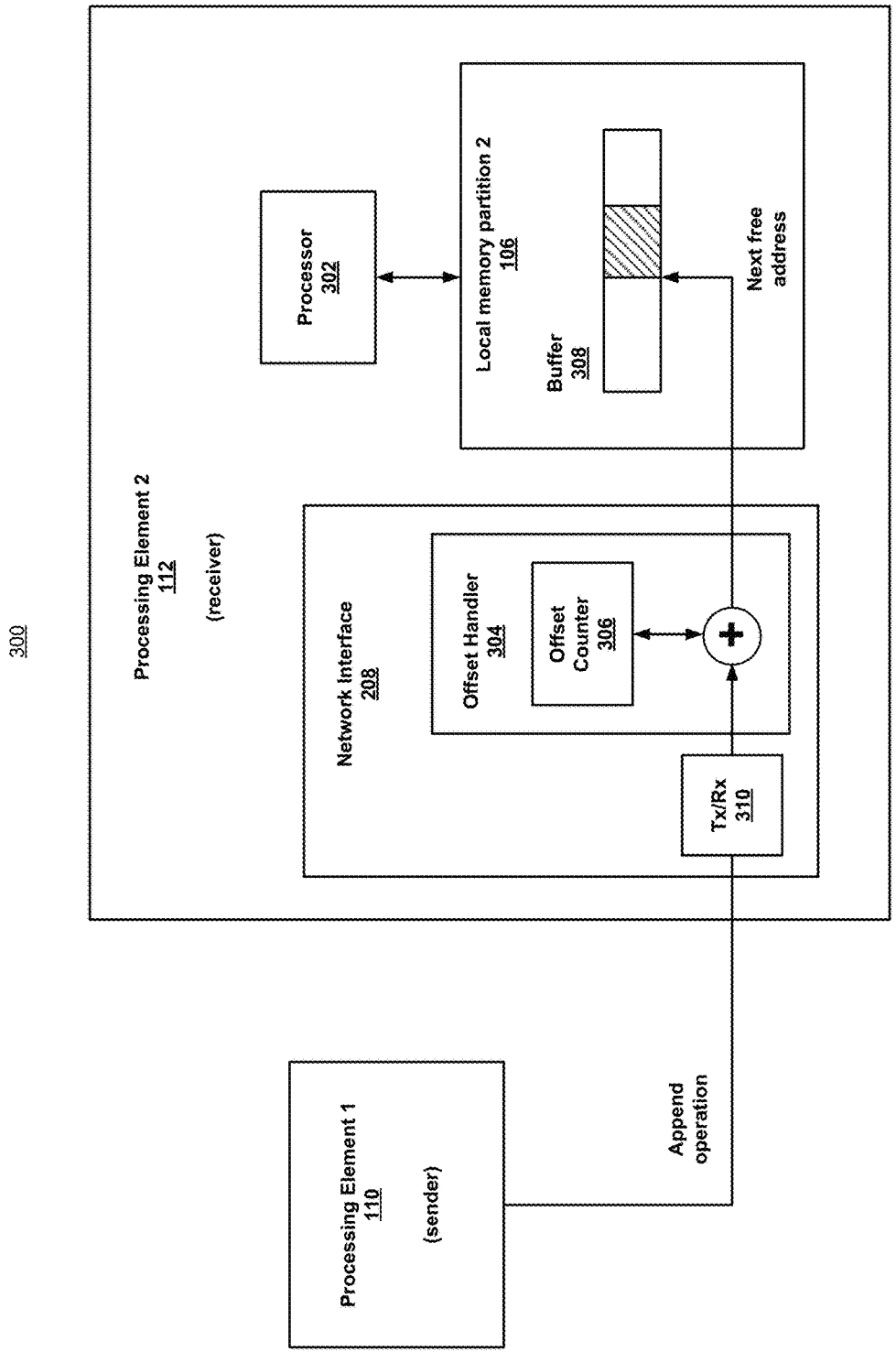
FIG. 3 illustrates a block diagram of another example embodiment consistent with the present disclosure.

FIG. 3 illustrates a block diagram 300 of another example embodiment consistent with the present disclosure. Two processing elements 110, 112 are shown and described in the context of a sending and receiving node respectively, operating in a receiver-managed scenario. Processing element 1 sends a command or message, for example, to perform an append operation, to processing element 2. The network interface 208, of processing element 2, is shown to include a transceiver 310 configured to send and receive messages over network 210. The messages may include data and control information. The control information may include the size of the data being transmitted in the message. Network interface 208 may further include an offset handler module 304 and an offset counter 306 configured to determine the destination address for the data within a buffer 308 of the local memory partition 106. Although only one offset counter and data buffer are shown for simplicity, in general there may be any number of pairs of offset counters and data buffers in use simultaneously. The offset handler 304 may be configured to calculate the destination address corresponding to the next free or available memory location in the buffer 308 based on a starting address of the buffer and an updated offset counter which may be incremented by the size of the data in each received message.

In some embodiments, therefore, a receiver-managed mechanism may be used to accelerate the operation of appending data from a sending node to a remote buffer on the receiving node. The remote buffer may be accessible through the PGAS. The receiver maintains the offset of the next available location in a given buffer which may be used to determine the destination address for data in an incoming message. When an appending message is processed, the receiver atomically updates the offset counter, allowing it to be used in the processing of subsequent append operations. This mechanism may similarly be used for read and write operations as well as append operations.

In some embodiments, a run-time mechanism (e.g., the offset handler 304) may be provided to efficiently support the one-sided append operation. This run-time mechanism may also be referred to as a one-sided append agent (OSA) and may be implemented in hardware, firmware, software or any combination thereof, for example on the network interface 208. In some embodiments the OSA may be triggered from interrupts generated by the network interface 208 in response to availability of new data. For example, the OSA may include firmware or software that is triggered by these interrupts to initiate the destination address calculation and offset counter update.

Figure 4:
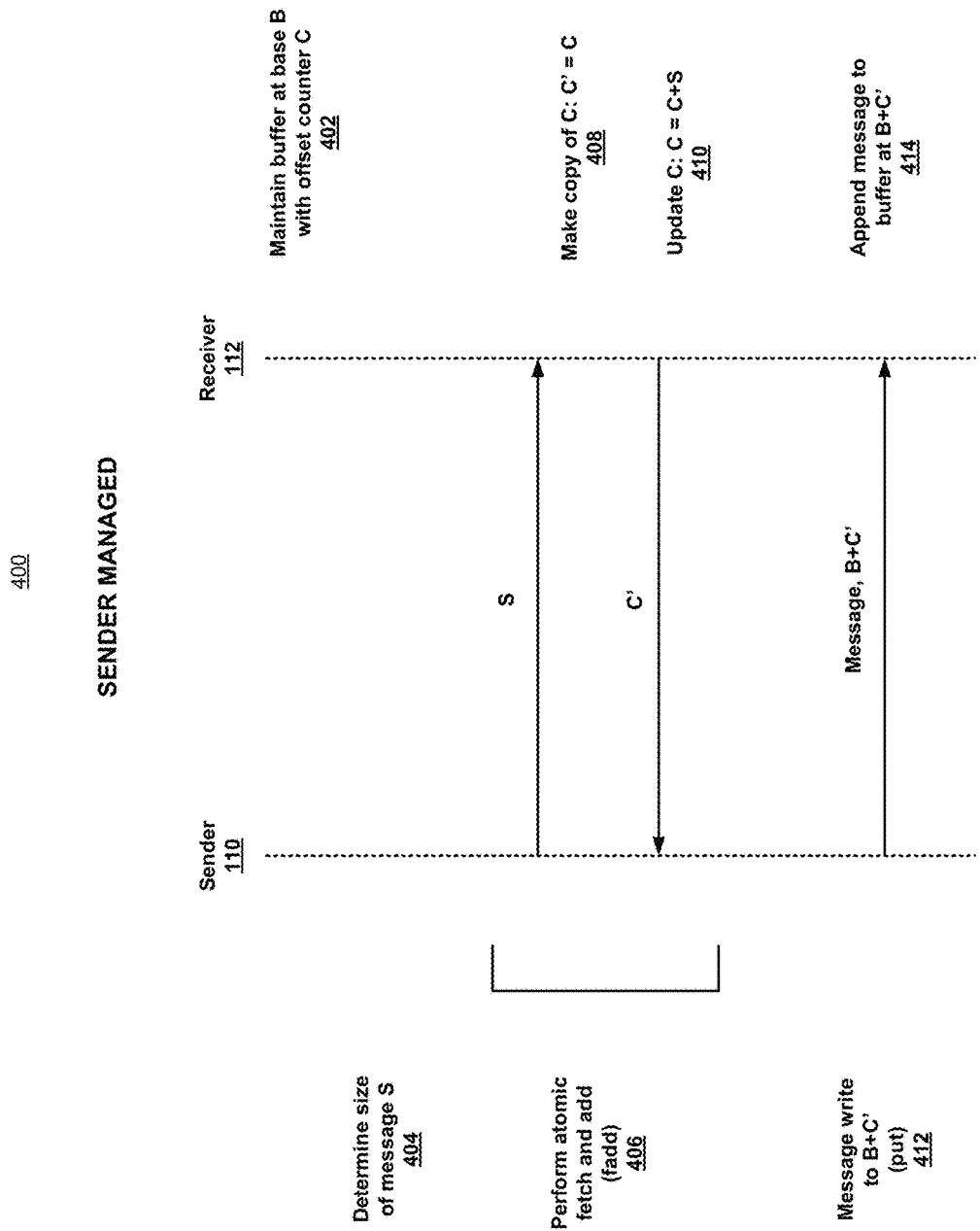
FIG. 4 illustrates a process/data flow diagram of an example embodiment.

FIG. 4 illustrates a process/data flow diagram 400 of an example embodiment. A conventional, sender-managed scenario is illustrated in FIG. 4. At operation 402, the receiver 112 maintains a data buffer with a base address B and a current offset counter C. The sender 110 determines the size S of a message to be sent to the receiver, at operation 404. The sender then performs an atomic fetch-and-add operation 406 where the size S is sent to the receiver and the receiver creates a copy C' (operation 408) of the offset counter C, which is sent back to the sender. The receiver updates the offset counter C by adding S to it, at operation 410, which may be completed atomically with operation 408. The sender then performs a message write (or put), at operation 412 to the address B+C' and the receiver appends the data from this message to the buffer at the address B+C' (operation 414).

Figure 5:
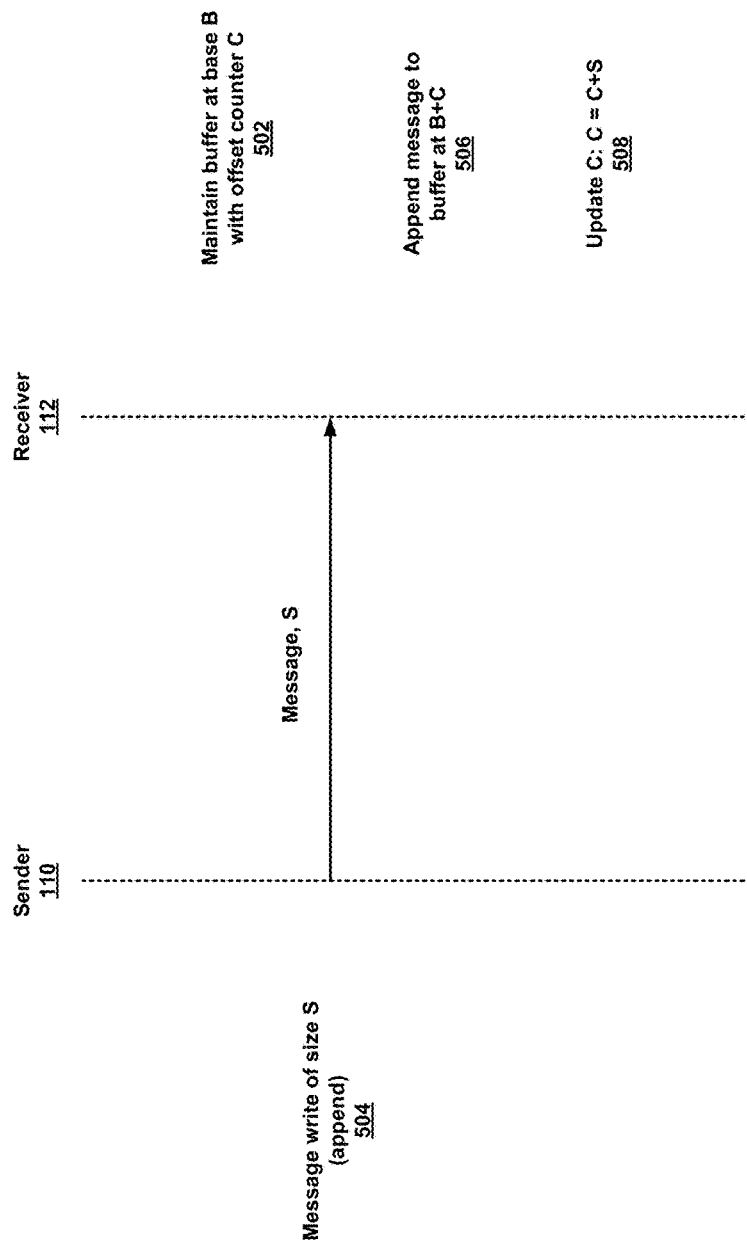
FIG. 5 illustrates a process/data flow diagram of another example embodiment consistent with the present disclosure.

FIG. 5 illustrates a process/data flow diagram 500 of another example embodiment consistent with the present disclosure. In this case, a receiver-managed scenario with improved efficiency is illustrated. As in the example above, the receiver 112 maintains a data buffer with a base address (B) and a current offset counter (C), at operation 502. Here however, the sender writes a message of size S, as an append operation 504, and the receiver appends the data from this message to the buffer at the address B+C, at operation 506. The receiver also updates C based on the size of the received data, S (e.g., C=C+S), at operation 508, in preparation for a subsequent append operation.

In some embodiments, an application programming interface (API) may be provided to support a one-sided append semantic from a sender node to a receiver node. The API may be provided, for example, as an extension to the OpenSHMEM specification. The following code snippet illustrates one possible API implementation as would be executed on the sender node or processing element:

```
// buffer for source of data on source processor local memory (sender
node)
int source_buffer[SOURCE_BUFFER_SIZE];
// buffer for receipt of data at destination processor local memory
// (receiver node), the buffer accessible through a PGAS
int destination_buffer[DESTINATION_BUFFER_SIZE];
// initialize offset counter on receiver node network interface,
// (returns a reference handle)
shmem_offset_counter_create(&handle,
        destination_buffer,
        DESTINATION_BUFFER_SIZE);
...
// for each processing element, append data of a specified size, from a
// specified location within the source buffer, to the destination buffer,
using
// the append semantic
for (pnum = 0; pnum < number_processing_elements; pnum++) {
    shmem_ append(handle,
        source_buffer+offset[pnum],
        append_size[pnum],
        pnum);
}
...
// when done, free the offset counter
shmem_offset_counter_free(&handle);
```

The shmem_offset_counter_create( ) function call may be configured to cause the network interface 208 on the receiver node side to initialize an offset counter and provides a reference handle for use by subsequent memory access calls (append, write, read, etc.). The OpenSHMEM environment provides for the offset counters to be symmetric, that is to say, all processing element have their own versions of each offset counter. This allows a processing element to address the remote (destination) buffer using its own offset counter handle and the remote processing element identifier. Thus, each processing node may then append data of a specified size (append_size[pnum]), from a specified location within the source buffer (source_buffer+offset[pnum]), to the destination buffer, using the referenced handle in the shmem_append( ) function call.

Additional operations may be provided by the API to read the current value of the offset counter and to reset the counter. For example:

```
// read the offset counter
shmem_offset_counter_get(handle);
// reset the offset counter
shmem_offset_counter_reset(handle);
```

Thus, the API can be seen to provide the capability to generate messages for the purpose of aggregating data (e.g., appending data) in a shared buffer that is stored in a global address space (PGAS).

Figure 6:
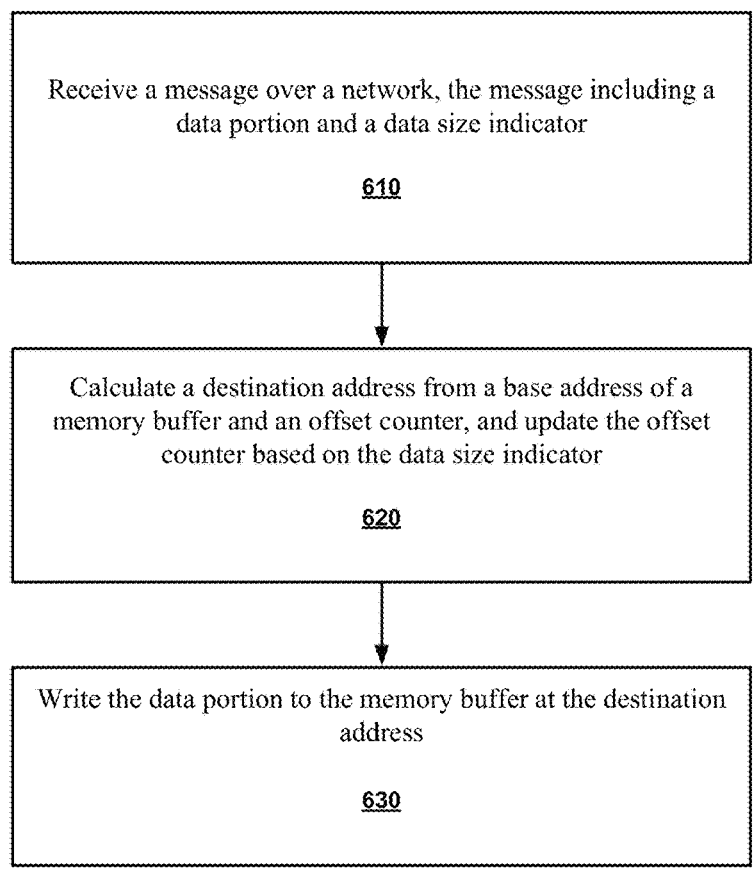
FIG. 6 illustrates a flowchart of operations of another example embodiment consistent with the present disclosure.

FIG. 6 illustrates a flowchart of operations 600 of another example embodiment consistent with the present disclosure. At operation 610, a message is received over a network. The message includes a data portion and a data size indicator. At operation 620, a destination address is calculated from a base address of a memory buffer and an offset counter and the offset counter is updated based on the data size indicator. The offset counter may be updated atomically with the destination address calculation to provide protection for the possibility that multiple append requests may arrive simultaneously. At operation 630, the data portion is written to the memory buffer at the destination address.

Figure 7A:
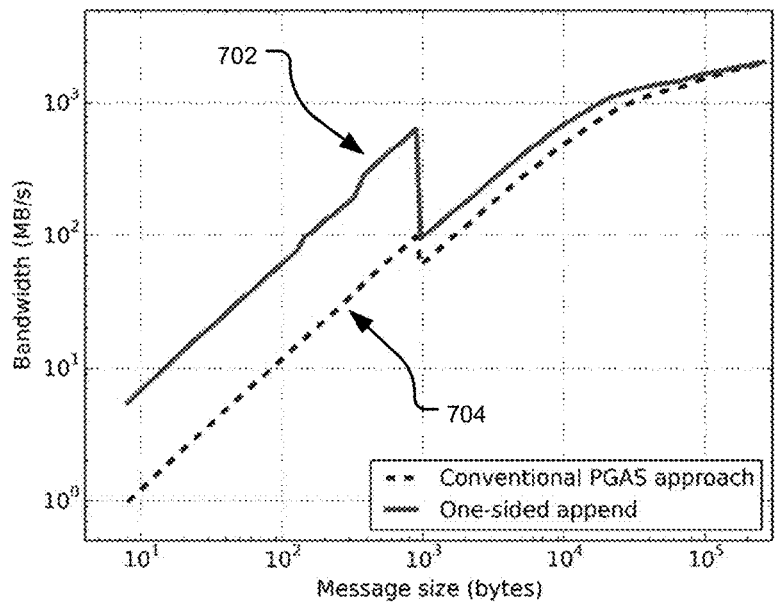
FIGS. 7(a) and 7(b) illustrate performance test results of another example embodiment consistent with the present disclosure.
Figure 7B:
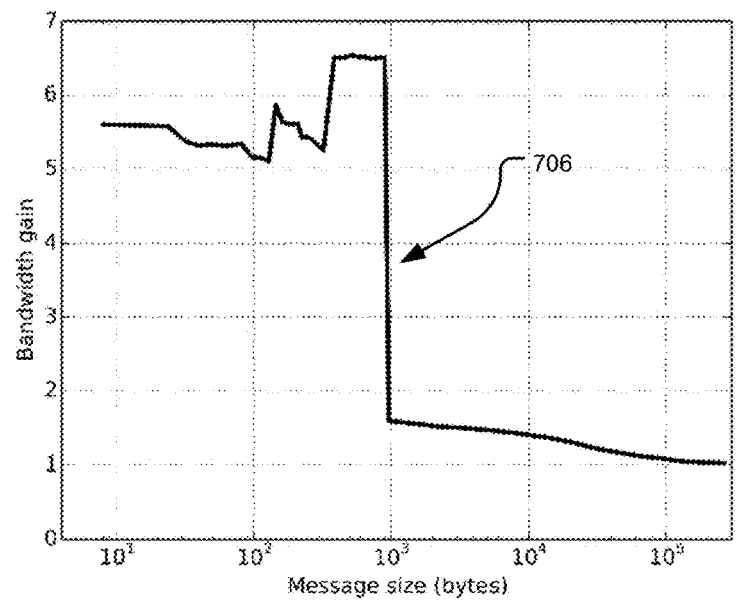

FIGS. 7(a) and 7(b) illustrate performance test results of another example embodiment consistent with the present disclosure. In this example of a software embodiment, a sorting key exchange algorithm was executed on a 16 node HPC Infiniband® cluster and PGAS memory, using both sender-managed and receiver-managed implementations for comparison. The tests were run with message sizes ranging from 10 bytes to 100 k bytes and the resulting communication bandwidth between sender and receiver nodes was measured for each case. The graph 704, in FIG. 7(a), illustrates the bandwidth for the sender-managed case while graph 702 illustrates the bandwidth for the receiver-managed case, as a function of message size, showing an improvement over the conventional sender-managed case. The improvement is more clearly illustrated in FIG. 7(b), where graph 706 shows the bandwidth improvement factor (i.e., the ratio of 702 to 704). It can be seen that there is an improvement of more than 500% for smaller sized messages (e.g., less than 1 k bytes in length). The transfer time for larger messages overwhelms the fixed cost of the fetch-and-add used in the sender-managed case, so the improvement of the receiver-managed technique decreases in the software embodiment of this example.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as, for example, processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hard-wired circuitry, programmable circuitry, state machine circuitry, and/or firmware that stores instructions executed by programmable circuitry. An application (or "app") may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip. In some embodiments, a module may thus be implemented in software and/or firmware and may comprise one or more processes, threads or subroutines of a single process. Additionally, in some embodiments, a module may be distributed and executed on separate devices.

Thus, the present disclosure provides systems, devices, methods and computer readable media for improved coordination between sender and receiver nodes in a one-sided memory access to a PGAS in a distributed computing environment. The following examples pertain to further embodiments.

According to Example 1 there is provided a network interface controller. The controller may include: a transceiver module configured to receive a message over a network, the message including a data portion and a data size indicator. The controller of this example may also include an offset handler module configured to calculate a destination address from a base address of a memory buffer and an offset counter. The transceiver module may further be configured to write the data portion to the memory buffer at the destination address and the offset handler module may further be configured to update the offset counter based on the data size indicator.

Example 2 may include the subject matter of Example 1, and the memory buffer is included in a local memory partition of a Partitioned Global Address Space.

Example 3 may include the subject matter of Examples 1 and 2, and the network interface controller and the local memory partition are included in a first processing element node of a High Performance Computing (HPC) system.

Example 4 may include the subject matter of Examples 1-3, and the message is generated by a second processing element node of the High Performance Computing (HPC) system.

Example 5 may include the subject matter of Examples 1-4, further including an interrupt handler to trigger an interrupt based on the received message, the interrupt to cause the offset handler module to initiate the destination address calculation and offset counter update.

Example 6 may include the subject matter of Examples 1-5, and the update of the offset counter is performed as an atomic operation.

Example 7 may include the subject matter of Examples 1-6, and the calculation of the destination address and the update of the offset counter are performed as an atomic operation.

According to Example 8 there is provided at least one computer-readable storage medium having instructions stored thereon which when executed by a processor result in the following operations. The operations may include receiving a message over a network, the message including a data portion and a data size indicator; calculating a destination address from a base address of a memory buffer and an offset counter; updating the offset counter based on the data size indicator; and writing the data portion to the memory buffer at the destination address.

Example 9 may include the subject matter of Example 8, and the memory buffer is included in a local memory partition of a Partitioned Global Address Space.

Example 10 may include the subject matter of Examples 8 and 9, and the local memory partition is included in a first processing element node of a High Performance Computing (HPC) system.

Example 11 may include the subject matter of Examples 8-10, and the message is generated by a second processing element node of the High Performance Computing (HPC) system.

Example 12 may include the subject matter of Examples 8-11, further including triggering an interrupt based on the received message, the interrupt initiating the destination address calculation and the offset counter update.

Example 13 may include the subject matter of Examples 8-12, further including performing the update of the offset counter as an atomic operation.

Example 14 may include the subject matter of Examples 8-13, further including performing the calculation of the destination address and the update of the offset counter as an atomic operation.

Example 15 may include the subject matter of Examples 8-14, further including providing an application programming interface to generate the message.

According to Example 16 there is provided a method. The method may include receiving a message over a network, the message including a data portion and a data size indicator; calculating a destination address from a base address of a memory buffer and an offset counter; updating the offset counter based on the data size indicator; and writing the data portion to the memory buffer at the destination address.

Example 17 may include the subject matter of Example 16, and the memory buffer is included in a local memory partition of a Partitioned Global Address Space.

Example 18 may include the subject matter of Examples 16 and 17, and the local memory partition is included in a first processing element node of a High Performance Computing (HPC) system.

Example 19 may include the subject matter of Examples 16-18, and the message is generated by a second processing element node of the High Performance Computing (HPC) system.

Example 20 may include the subject matter of Examples 16-19, further including triggering an interrupt based on the received message, the interrupt initiating the destination address calculation and the offset counter update.

Example 21 may include the subject matter of Examples 16-20, further including performing the update of the offset counter as an atomic operation.

Example 22 may include the subject matter of Examples 16-21, further including performing the calculation of the destination address and the update of the offset counter as an atomic operation.

Example 23 may include the subject matter of Examples 16-22, further including providing an application programming interface to generate the message.

According to Example 24 there is provided a system. The system may include means for receiving a message over a network, the message including a data portion and a data size indicator; means for calculating a destination address from a base address of a memory buffer and an offset counter; means for updating the offset counter based on the data size indicator; and means for writing the data portion to the memory buffer at the destination address.

Example 25 may include the subject matter of Example 24, and the memory buffer is included in a local memory partition of a Partitioned Global Address Space.

Example 26 may include the subject matter of Examples 24 and 25, and the local memory partition is included in a first processing element node of a High Performance Computing (HPC) system.

Example 27 may include the subject matter of Examples 24-26, and the message is generated by a second processing element node of the High Performance Computing (HPC) system.

Example 28 may include the subject matter of Examples 24-27, further including means for triggering an interrupt based on the received message, the interrupt initiating the destination address calculation and the offset counter update.

Example 29 may include the subject matter of Examples 24-28, further including means for performing the update of the offset counter as an atomic operation.

Example 30 may include the subject matter of Examples 24-29, further including means for performing the calculation of the destination address and the update of the offset counter as an atomic operation.

Example 31 may include the subject matter of Examples 24-30, further including means for providing an application programming interface to generate the message.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system comprising a receiving node comprising a network interface controller and a local memory partition comprising a buffer, the network interface controller comprising transceiver circuitry, offset handler circuitry, and an offset counter, wherein:

the transceiver circuitry is configured to receive a first message from at least one transmitting node via a network coupled to said receiving node, the first message comprising an append data command identifying a size of data within the first message to be written to said buffer;

in response to receipt of the first message:
the offset handler circuitry is configured, independent of further communication with any transmitting node, to:
determine, based on a current value of said offset counter, a first destination address within the buffer for data within the first message; and
generate an updated counter value by incrementing the current value of the offset counter by the size of the data in the first message, the updated counter value to be used in determining a destination address in response to a subsequent message from a transmitting node, the subsequent message comprising an append data command identifying a size of data within the subsequent message to be written to the buffer; and
the receiving node is configured to append, independent of further communication with any transmitting node, the data within the first message to the buffer based on the first destination address.

2. The controller of claim 1, wherein said local memory partition is a local memory partition of a Partitioned Global Address Space.

3. The controller of claim 2, wherein said receiving node is included in a first processing element node of a High Performance Computing (HPC) system.

4. The controller of claim 3, wherein said transmitting node is included in a second processing element node of said High Performance Computing (HPC) system.

5. The controller of claim 1, further comprising an interrupt handler to trigger an interrupt based on said received message, said interrupt to cause said offset handler circuitry to initiate said destination address calculation and offset counter update.

6. The controller of claim 1, wherein generating said updated counter value is performed as an atomic operation.

7. The controller of claim 1, wherein determining said first destination address and generating said updated counter value are performed as an atomic operation.

8. At least one non-transitory computer-readable storage medium having instructions stored thereon which when executed by a processor of a receiving node comprising network interface controller and a local memory partition comprising a buffer, the network interface controller comprising transceiver circuitry, offset handler circuitry, and an offset counter, result in the following operations comprising:
receiving, with the transceiver circuitry, a first message from at least one transmitting node via a network coupled to the receiving node, the first message comprising an append data command identifying a size of data within the first message to be written to said buffer;
in response receipt of the first message:
the offset handler circuitry is configured, independent of further communication with any transmitting node, to:
determine, based on a current value of said offset counter, a first destination address within the buffer for data within the first message; and
generate an updated counter value by incrementing the current value of the offset counter by the size of the data in the first message, the updated counter value to be used in determining a destination address in response to a subsequent message from a transmitting node, the subsequent message comprising an append data command identifying a size of data within the subsequent message to be written to the buffer; and
the receiving node is configured to append, independent of further communication with any transmitting node, the data within the first message to the buffer based on the first address.

9. The non-transitory computer-readable storage medium of claim 8, wherein said local memory partition is a local memory partition of a Partitioned Global Address Space.

10. The computer-readable storage medium of claim 9, wherein said receiving node is included in a first processing element node of a High Performance Computing (HPC) system.

11. The non-transitory computer-readable storage medium of claim 10, wherein said transmitting node is included in a second processing element node of said High Performance Computing (HPC) system.

12. The non-transitory computer-readable storage medium of claim 8, wherein said instructions when executed by said processor further result in performance of the following operations comprising triggering an interrupt based on said received message, said interrupt initiating said destination address calculation and said offset counter update.

13. The non-transitory computer-readable storage medium of claim 8, wherein generating said updated counter value is performed as an atomic operation.

14. The non-transitory computer-readable storage medium of claim 8, wherein determining said first destination address and generating said updated counter value are performed as an atomic operation.

15. A method for receiver management of destination addresses in a high performance computing system comprising a receiving node that comprises a network interface controller and a local memory partition comprising a buffer, the network interface controller comprising transceiver circuitry, offset handler circuitry, and an offset counter, the method comprising:
receiving, with the transceiver circuitry, a first message from at least one transmitting node via a network coupled to the receiving node, the first message comprising an append data command identifying a size of data within the first message to be written to said buffer;
in response receipt of the first message:
the offset handler circuitry is configured, independent of further communication with any transmitting node, to:
determine, based on a current value of said offset counter, a first destination address within the buffer for data within the first message; and
generate an updated counter value by incrementing the current value of the offset counter by the size of the data in the first message, the updated counter value to be used in determining a destination address in response to a subsequent message from a transmitting node, the subsequent message comprising an append data command identifying a size of data within the subsequent message to be written to the buffer; and
the receiving node is configured to append, independent of further communication with any transmitting node, the data within the first message to the buffer based on the first address.

16. The method of claim 15, wherein said local memory partition is a local memory partition of a Partitioned Global Address Space.

17. The method of claim 16, wherein said receiving node is included in a first processing element node of a High Performance Computing (HPC) system.

18. The method of claim 17, wherein said transmitting node is included in a second processing element node of said High Performance Computing (HPC) system.

19. The method of claim 15, further comprising triggering an interrupt based on said received message, said interrupt initiating said destination address calculation and said offset counter update.

20. The method of claim 15, wherein generating said updated counter value is performed as an atomic operation.

21. The method of claim 15, wherein determining said first destination address and generating said updated counter value are performed as an atomic operation.

* * * * *